(12) United States Patent
Lattner et al.

(10) Patent No.: US 6,705,163 B1
(45) Date of Patent: Mar. 16, 2004

(54) LIQUID LEVEL GAUGE AND SPOOL LOCK THEREFOR

(75) Inventors: Michael D. Lattner, Dubuque, IA (US); Adam J. Koehler, Dubuque, IA (US)

(73) Assignee: Morrison Bros. Company, Dubuque, IA (US)

(*) Notice: Subject to any disclaimer, the term of this patent is extended or adjusted under 35 U.S.C. 154(b) by 0 days.

(21) Appl. No.: 09/315,671

(22) Filed: May 20, 1999

Related U.S. Application Data
(60) Provisional application No. 60/093,033, filed on Jul. 16, 1998.

(51) Int. Cl.[7] .................................................. G01E 23/30
(52) U.S. Cl. ........................................................ 73/309
(58) Field of Search .......................... 73/309, 313, 321; 156/361, 577, 183; 53/136.5; D8/356, 394; 370/388.6; 206/394, 392, 398, 389

(56) References Cited

U.S. PATENT DOCUMENTS

| | | | |
|---|---|---|---|
| 3,482,447 A | 12/1969 | Bennett | 73/321 |
| 4,572,370 A * | 2/1986 | Cedenblad et al. | 206/398 |
| 5,144,836 A * | 9/1992 | Webb | 73/319 |
| 5,163,554 A * | 11/1992 | Lampropoulos et al. | 206/363 |
| 5,476,712 A * | 12/1995 | Hartman et al. | 428/317.3 |
| 5,649,450 A | 7/1997 | Glab et al. | 73/307 |
| 5,800,368 A * | 9/1998 | Klingermann et al. | 602/1 |

* cited by examiner

Primary Examiner—Edward Lefkowitz
Assistant Examiner—Jewel V. Thompson
(74) Attorney, Agent, or Firm—Marshall, Gerstein & Borun LLP

(57) ABSTRACT

A gauge assembly for use in measuring the level of a liquid in a storage tank is disclosed. The assembly includes a housing having an interior and having a lower opening communicating with that interior. A flanged spool is rotatably mounted within the housing and has wound thereabout a filament extending through the opening with its free end attached to a float element within the tank. A spring is connected to the spool and exerts a rotating force for winding the filament under the spool, and a removable strip of adhesive tape has opposite end portions adhering to the housing and a central portion adhering to the spool for locking for releasably securing the spool against rotation. A second strip of adhesive tape may also be used for detachably securing the filament to the housing.

13 Claims, 1 Drawing Sheet

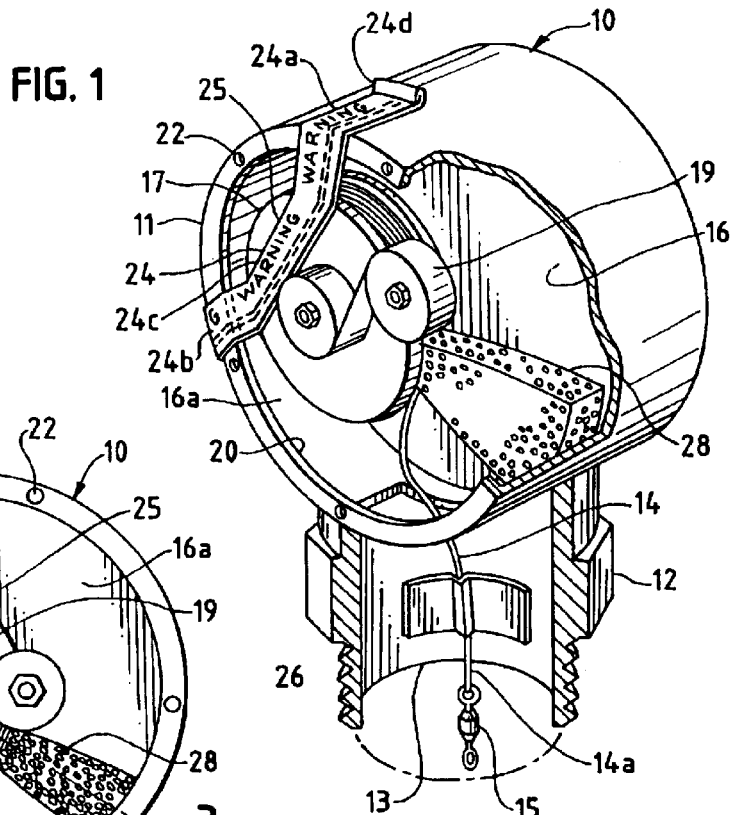
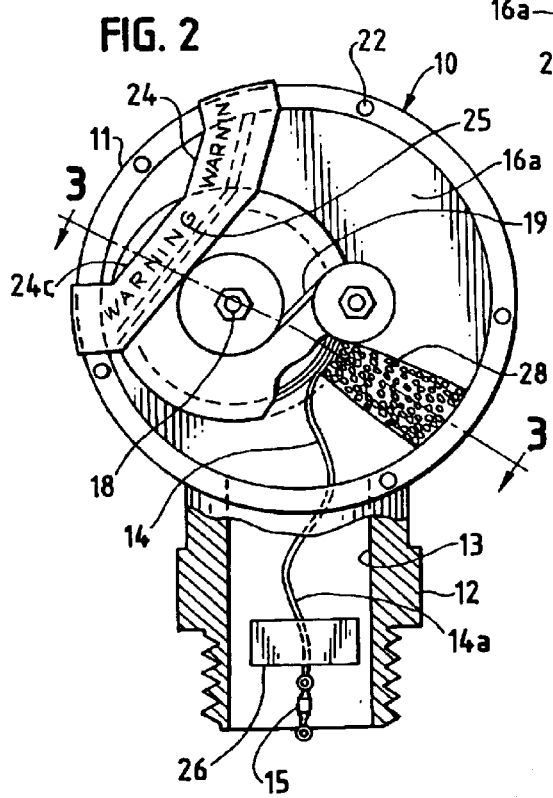
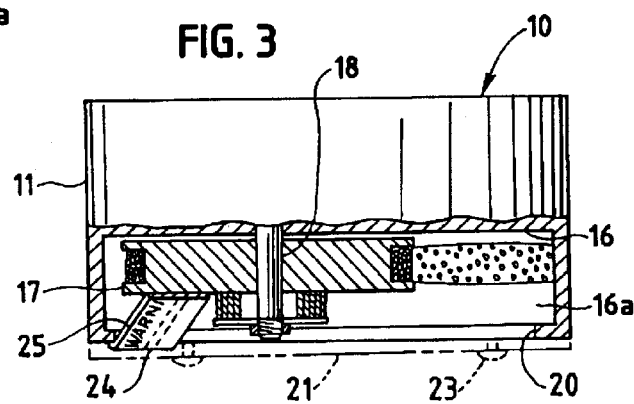
FIG. 1
FIG. 2
FIG. 3

LIQUID LEVEL GAUGE AND SPOOL LOCK THEREFOR

This application claims benefit of Provisional Appl. No. 60/093,033 filed Jul. 16, 1998.

BACKGROUND AND SUMMARY

Bennett patent U.S. Pat. No. 3,482,447, Glab et al U.S. Pat. No. 5,649,450, and Webb U.S. Pat. No. 5,144,836 all disclose liquid level sensing gauges for use with storage tanks for liquid fuels and the like. The gauge assemblies include, in each case, a gauge housing designed to be mounted at a top opening of a liquid storage tank. Within the housing is a spring-biased spool upon which a filament is wound. The end of the filament extends into the tank through its opening and is connected to a float member that floats on the surface of the liquid. Indicator means mounted on the housing or associated therewith is calibrated to reveal the liquid level in the tank by means of the extent to which the filament has been unwound from the spool. In all patents, the floats are too large to pass upwardly through the tank openings into the housings of the gauge assemblies, and in the Webb and Glab et al patents clip means are provided at the ends of the filaments to act as stop elements to prevent the filaments from retracting completely into the housings even when the clips are unattached to floats.

A main advantage of providing a housing with a lower opening that is too small to allow an adapter clip to be pulled by the filament upwardly into the housing is that the gauge may be shipped and connected by the user to other components without fear that the filament will be drawn completely into the housing before a float is attached to the clip. Such an arrangement also has its disadvantages, however. It is possible during shipment that the constant force exerted by the spring on the spool is insufficient to keep the filament in wound condition on the spool. A more likely possibility is that at the time of installation a user might pull on the clip to withdraw a portion of the filament and then intentionally or unintentionally release the clip, causing retraction of the filament by reason of the constant-force spring acting on the spool. If the pulling and releasing actions are performed quickly, faster than can be accommodated by the inertia of the spool, one or more windings of filament may come off the spool and jam the gauge mechanism. Untangling the filament within the housing is a job that is usually beyond the capabilities of the user or installer, with the result that a disconcertingly high number of gauge assemblies must be returned to the manufacturer for disassembly, correction, and reassembly of such gauges.

Accordingly, a main aspect of this invention lies in providing a gauge assembly with spool locking means that eliminates or greatly reduces the possibility of a filament coming unlooped from a spool and tangled within a housing during shipment, storage and/or handling prior to installation and at the time of installation. More specifically, it is an object of this invention to provide an assembly in which the free end of the filament, although exposed for attachment to a float at the time of assembly, cannot be pulled to rotate the spool to cause a "yo-yo" action of the spool until locking means are removed from the interior of the housing.

The locking means takes the form of at least one strip of a removable adhesive tape having opposite end portions adhering to the housing and having a central portion adhering to an end wall of the spool. The tape therefore locks the spool against rotation until such time as the tape is peeled away from the housing and spool. Because the tape is relatively wide, it provides a substantial surface on which warning indicia and appropriate instructions may be imprinted. Therefore, during handling and installation, purchasers and installers may be clearly informed as to the purpose of the tape and the procedures and timing for its removal.

The housing for the gauge assembly has an access opening for exposing the spool and a removable cover that extends over that access opening. The central portion of the tape contacts and immobilizes the spool within the housing and the cover must therefore be detached before the locking tape can be removed.

The locking means may also include a second strip of adhesive tape detachably securing the otherwise free end of the filament to the housing (the housing includes the threaded tubular neck for attaching the gauge assembly to a liquid storage tank). In addition, removable resilient means may be provided within the housing for engaging and holding the filament upon the spool. Such resilient means may take the form of a compressible foam wedge element disposed within the housing and compressibly engaging both the filament wound upon the spool and an adjacent wall surface of the housing. Such foam wedge element is easily removed from the housing through the access opening at the time of installation.

DRAWINGS

FIG. 1 is a perspective view of a gauge assembly embodying the locking means of this invention, the assembly being shown with its cover removed and with wall sections broken away to reveal features of the locking means.

FIG. 2 is a side elevational view of the gauge assembly shown in FIG. 1.

FIG. 3 is a sectional view taken along line 3—3 of FIG. 2.

DETAILED DESCRIPTION OF PREFERRED EMBODIMENT

Referring to the drawings, the numeral 10 designates a gauge assembly that includes a housing 11 having a tubular neck 12 and an opening 13 through which the distal end of a filament 14 may be extended. At its distal end 14a, the filament is provided with a swivel 15 that may in turn be connected to a suitable float (not shown).

The operating mechanism within the housing is essentially the same as shown and described in U.S. Pat. Nos. 5,649,450 and 5,144,836, the disclosures of which are incorporated herein by reference. A partition 16 separates the housing into two compartments, one of which contains the gear mechanism and associated elements for measuring and recording the liquid level within a storage tank (not shown). Compartment 16a contains a flanged spool or reel 17 rotatably supported by a horizontal shaft 18 connected to the operating mechanism on the opposite side of partition 16. A constant-force spring 19 urges the spool in one direction (counterclockwise as shown in FIGS. 1 and 2) to maintain the filament 14 in wound condition upon the spool unless a pulling force of greater magnitude is applied to end 14a of the filament. As indicated in the aforementioned patents, the force of spring 19 should be sufficient to maintain filament 14 in taut condition when the assembly is installed and a float (not shown) is connected to the filament and is carried on the surface of the liquid stored in the tank.

As shown in the drawings, housing 11 has a large access opening 20 at one side that exposes compartment 16a, spool 17, and spring 19 when cover 21 (shown in phantom in FIG. 3) is removed. The cover may be removably secured to the remainder of the housing by any suitable means. In the particular illustration given, the flange of the housing is provided with threaded openings 22 for receiving screws 23, but other means of attachment may be provided if desired.

Locking means are provided for immobilizing spool 17 during shipment, storage, and during handling in the early stages of gauge installation. Such locking means includes a first strip of adhesive tape 24 that has opposite end portions 24a and 24b adhesively joined to housing 11 and a central portion 24c adhering to a face or end wall of spool 17. The tape engages the end surfaces of the housing defining opening 20 as well as the housing's outer cylinrical surface, as depicted most clearly in FIG. 1. The adhesive of the tape should be aggressive enough so that there is no danger of the central portion 24c becoming released from the spool, or of end portions 24a and 24b becoming detached from the outer surfaces of the housing, during shipment, storage and handling. The adhesive connection between the tape and the housing is augmented by the clamping action between the cover 21 and the end face of the housing when the cover is tightly in place.

The ends 24d of the tape may be folded upon themselves as shown in FIG. 1 to provide tabs to facilitate the commencement of a peeling action when tape strip 24 is to be removed. Indicia 25 imprinted upon the tape may be used to caution a user against premature removal and provide instructions for removal at the time of installation.

A second adhesive tape strip 26 is located within the housing to at least partially immobilize the distal end 14a of the filament. In the embodiment shown in the drawings, tape strip 26 secures the distal end to the inside surface of tubular neck portion 12 adjacent opening 13; however, if desired, the second strip 26 may adhere the distal end to other surfaces, either internal or external, of the housing. Thus, strip 26 may adhere the distal end of the filament to partition or bulkhead 16 or, alternatively, to an outer surface of tubular neck 12. In the latter case, strip 26 would be readily visible and would appropriately carry cautionary and instructional indicia.

Tape strips 24 and 26 may be formed of any tough, flexible and preferably non-stretchable material. A polymeric material such as polyethylene terephthalate (commercially available as Mylar from E.I. duPont deNemours, Wilmington, Del.) is particularly suitable, but other polymeric film materials having similar properties may be used. Alternatively, the tape may be formed of cloth or metal. It should be sufficiently opaque to be printable, and is preferably brightly colored so that it will be readily noticed by a user. The pressure-sensitive adhesive backing may be any suitable adhesive that is sufficiently aggressive to remain securely attached to the spool and surfaces of the housing until the tape is intentionally peeled away.

Resilient means are provided within the housing for engaging and holding the filament upon spool 17. In the embodiment illustrated, such resilient means takes the form of a resilient wedge body or block 28 that extends between the filement winding on the spool 17 and the wall of housing 11. When positioned as shown in the drawings, the wedge body is radially compressed and exerts a force upon the filament winding that is sufficient to insure that the winding remains in place (even if there is slight slack in the distal end portion of the filament as shown), with such compressive force also serving to hold the wedge element in place. The wedge may be formed of any compressible material such as, for example, natural or artificial rubber, resilient polymeric foam materials, etc.

At the time of installation, the neck of the gauge may be threaded directly into the mounting collar at the upper end of a storage tank or, if necessary, may be joined to a suitable adapter which in turn is connected to the tank. Once it is established that the parts are properly sized for such connection, and before the connection is actually made, tape strip 26 is removed and the distal end of the filament is connected to a suitable float member (not shown). Thereafter, the float is introduced into the tank through its upper opening and collar 12 is threaded onto the tank. Wedge element 28 is removed through the access opening 20 of the housing and tape 24 is stripped away, followed by replacement of cover 23. As explained in the aforementioned patents, there are also calibration steps that may be involved as well as the adjustment of an alarm system (if provided) for indicating when a predetermined maximum fluid level in the storage tank exists.

What is claimed is:

1. A gauge assembly for use in measuring a level of a liquid in a storage tank, comprising a housing having means for mounting said housing upon a storage tank having an interior; said housing having a lower opening for communicating with said interior; a flanged spool rotatably mounted within said housing; a filament having an end connected to said spool and extending through said opening with an opposite end of said filament being attachable to a float element within said tank; spring means connected to said spool and exerting a rotating force thereon for winding up said filament on said spool; said housing having an access opening for exposing said spool and having a removable cover over said access opening; wherein the improvement comprises first locking means for releasably securing said spool against rotation within said housing; said locking means comprising a first strip of adhesive tape having opposite end portions removably adhering to said housing and a central portion removably adhering to said spool.

2. The assembly of claim 1 in which said adhesive of said tape is a pressure-sensitive adhesive.

3. The assembly of claim 1 in which said end portions of said tape extend along exterior surfaces of said housing immediately adjacent said access opening.

4. The assembly of claim 3 in which said end portions of said tape extend over and adhere to exterior surfaces of said housing at substantially right angles to said surfaces of said housing immediately adjacent said access opening.

5. The assembly of claim 3 in which said central portion of said tape extends along a plane normal to the axis of rotation of said spool.

6. The assembly of claim 5 in which said spool has an end wall facing said access opening; said central portion of said tape being removably adhered to said end wall.

7. The assembly of claim 1 in which said tape carries instructional indicia imprinted thereon.

8. The assembly of claim 1 in which second locking means are provided for removably attaching said opposite end of said filament to said housing.

9. The assembly of claim 8 in which said second locking means comprises a second strip of adhesive tape detachably securing said opposite end of said filament to said housing.

10. The assembly of claim 9 in which said second strip of tape detachably secures said opposite end of said filament to an interior surface of said housing adjacent said lower opening thereof.

11. The assembly of claim 1 in which removable resilient means are provided within said housing for engaging and holding said filament upon said spool.

12. The assembly of claim 11 in which said resilient means comprises a compressible foam wedge element disposed within said housing and compressively engaging both said filament wound upon said spool and an opposing wall surface of said housing.

13. The assembly of claim 12 in which said wedge element is removable from said housing through said access opening.

* * * * *